3,427,172
METHOD FOR PROTECTING AUTOMOBILE
UNDERSIDES WITH ASPHALT EMULSION
Joseph C. Roediger, Westfield, N.J., Eugene E. Tompkins, Winchester, Mass., and George H. Schoenbaum, West Islip, N.Y., assignors to Esso Research and Engineering Company, a corporation of Delaware
No Drawing. Continuation of application Ser. No. 245,655, Dec. 19, 1962. This application Mar. 30, 1966, Ser. No. 540,147
U.S. Cl. 106—14     1 Claim
Int. Cl. C09d 5/08; C08h 13/00

ABSTRACT OF THE DISCLOSURE

A method of protecting the metal undersides of an automobile which comprises spray coating said metal undersides with an asphalt-in-water emulsion containing 0.2 to 20 wt. percent of the sodium salt of n-coco-amino butyric acid.

---

This application is a continuation of application Ser. No. 245,655, filed Dec. 19, 1962, and now abandoned.

The present invention relates to asphalt emulsion automobile undercoating compositions and their use as rust preventives.

Solvent-cutback, hard film rust preventives are well known in the art for use in the protection of metals exposed to a variety of corrosive environments. These materials generally comprise an asphalt diluted or "cutback" with large quantities of a volatile solvent to thereby fluidize the asphalt so that it may be readily applied to the metal surfaces by dipping, brushing or spraying. Upon evaporation of the solvent, an adherent thin asphalt film remains on the metal parts to serve as protection against weathering, corrosive fumes, and the like.

For coating the undersides of automobiles, it is preferable to utilize asphalts having high consistencies or softening points in order that the applied coating be kept in place and retain its shape in warm weather, to provide suitable low temperature strength properties for winter use, and to resist the abrasive action of stones, sand, etc. For such purposes, asphalts having softening points of 150 to 220° F. (ASTM D-36), e.g. 160 to 180° F., are usually desired in contrast to those asphalts having softening points less than 150° F., e.g. 100 to 135° F., which are customarily used in the road-making art. These relatively hard asphalts, e.g. those having softening points of about 160 to 180° F., provide excellent protection against rust formation and are conveniently applied to the metallic surfaces in the solvent "cut-back" form. However, the use of such solvent-based compositions is contraindicated for many purposes, particularly for automobile undercoating operations which are performed in relatively closed, confined and poorly ventilated areas, due to the serious safety hazards presented by the inherent dangers of flash fires, explosions, and toxicity. Moreover, another major disadvantage of the use of solvent-based compositions is that the metal surfaces defining the automobile underside, must usually be thoroughly dry prior to application of the coating in order to ensure proper adherence of the coating. Since there metal surfaces are ordinarily water-wet prior to the application of the coating, due to the usual necessity of washing the surface free of accumulated dirt and grime, extensive drying procedures are needed prior to application of the undercoating composition, owing to the inability of the solvent-based composition to adhere to the wet surfaces. Attempts to apply solvent-based coatings to such water-wet surfaces without thorough drying usually result in very poor adherence of the coating and consequent excessive drippage and waste.

The above-mentioned disadvantages of solvent-based asphalt under coating compositions may be overcome by utilizing water emulsions of high softening point asphalts for coating automobile undersides in order to provide protection against rust. The asphalt-in-water emulsion is readily applied to the automobile underside and upon "breaking" and evaporation of the carrier medium leaves the desired hard asphalt film on the surface.

It is fully recognized that asphalt-in-water emulsions are well known in the prior art for use as rust preventive coating compositions. However, the use of high consistency (e.g. 160 to 180° F. softening point) asphalts in such emulsions is not known to have been directed to automobile undercoating operations, primarily because of the difficulty of emulsifying these desired relatively hard, high consistency asphalts into water. As mentioned previously, suitable asphalts for undercoating purposes should preferably have softening points of 150 to 220° F. in order to provide adequate protection, adherence and low temperature properties (e.g. impact resistance, hardness, brittleness, cracking resistance, etc.). However, asphalts having the required hardness and consistency properties are difficult, if not impossible, to emulsify in conventional emulsifying equipment (e.g. colloid mills, homogenizers, or other similar fluid-shearing devices) due to their high viscosity. As a result, it has been generally required to either apply the relatively hard asphalts in the "solvent cut-back" form, with all the accompanying disadvantages hereinbefore discussed, or to utilize the relatively soft asphalts commonly employed in the road-making art.

One solution to this problem, namely, the utilization of a relatively hard asphalt having a low-enough viscosity to be easily handled in conventional emulsification equipment, is to heat the asphalt to a high-enough temperature to thereby reduce its viscosity to the desired value. However, this procedure usually proves futile, since the inlet temperature, to which the asphalt must necessarily be raised to form a satisfactory emulsion, causes the outlet temperature of the emulsion (as it leaves the emulsifying equipment) to be close to the boiling point of water. As a result, the water contained in the emulsion is immediately caused to evaporate or boil, thereby prematurely breaking the emulsion. By way of illustration, a conventional procedure for producing asphalt-in-water emulsions for road-making purposes and the like involves feeding separate streams of (1) a low consistency asphalt, e.g. of about 105° F. softening point, at a temperature of about 230 to 260° F. and (2) an emulsifying solution of a desired formulation (e.g. soap solution, etc.), at a temperature of about 120 to 150° F., to a conventional colloid mill, homogenizer, or the like. The viscosity of 105° softening point asphalt at temperatures of 230° to 260° F. is about 6 to 40 poises. In order to be stable, the emulsion formed should generally have a temperature of about 180° F. at atmospheric pressure, with a maximum upper limit of 190° F., in order to prevent water evaporation and consequent reversion of the emulsion. The utilization of, for example, 160 to 180° F. softening point asphalts, at the normal feed temperatures of 230 to 260° F., is impractical in conventional emulsification equipment due to their high viscosities at these temperature (e.g. usually about 200 to 540 poises at 230° F. and 56 to 130 poises at 260° F.). Moreover, raising the temperature of the asphalt feed stream to 315 to 340° F. in order to reduce the viscosities of these types of asphalts to the practical working values of 6 to 40 poises is usually ineffectual, since the high feed temperature allows the outlet temperature of the resulting emulsion to exceed the allowable upper limit of about 190° F., and consequently causes reversion of the emulsion. While stable emulsions of such asphalts can be prepared by cumbersome procedures such as pressurizing the outlet emulsion stream, or employing special high-shear emulsification equipment, such procedures would naturally be expensive and impractical.

Accordingly, the compositions of the present invention are prepared by a convenient method for producing stable, relatively solvent-free, water emulsions of relatively hard asphalts in conventional emulsification equipment. (By "relatively solvent-free" is meant a solvent content of less than about 10 weight percent, as compared to a solvent content in a conventional "solvent cut-back" asphalt composition of about 20 to 30 weight percent solvent, said weight percents being based upon the weight of the asphalt. By "relatively hard asphalts" is meant asphalts having a minimum softening point of 150° F.) This method involves utilizing a small amount of a volatile solvent to reduce the viscosity of a relatively hard asphalt to a level (e.g. about 6 to 40 poises) such that it can be readily emulsified with water in conventional emulsification equipment to form a stable asphalt-in-water emulsion. In this manner, the various advantages of the water-based asphalt emulsion coating compositions are realized, without sacrificing the convenience and practicality of using conventional equipment. The danger of explosion is considerably lessened due to the greatly reduced solvent content of the composition, and the emulsion, being water-based, readily adheres to water-wet metallic surfaces, thereby obviating the need for extensive drying procedures. Other incidental advantages include the facility of cleanup of the application area which can simply be flooded with water, the reduced contamination of the surrounding atmosphere with solvent, etc.

As previously mentioned, the asphalt utilized in the compositions of the present invention should have a certain minimum consistency or softening point. Asphalt, not being a crystalline material, does not have a sharp melting point but gradually softens as the temperature increases. The softening properly is usually determined by ASTM Method D-36. In this method, the softening point is defined as the temperature in degrees Fahrenheit of a heating bath when a ⅜-inch solid steel ball drops through a ⅝-inch diameter x ¼-inch thick mold of asphalt held in a standard metal ring. Closely related to the softening point is the relative hardness or "penetration" of the asphalt which is the major consistency control of most asphalt grades. The penetration of an asphalt at a given temperature is usually determined by ASTM Method D-5. This standard method utilizes a "penetrometer," wherein the hardness or penetration value is defined as the distance in hundredths of a centimeter that a standard needle vertically penetrates the sample under specified conditions of load, time, and temperature. The penetration value varies inversely with the consistency of the asphalt, i.e. the lower the penetration value, the more viscous the asphalt. The normal value for grade identification is determined at 77° F., 100 grams needle load, and 5 seconds duration.

The asphalts contemplated for use in the present invention should have penetrations no greater than 40, e.g. 20 to 40, and softening points no less than 150° F., e.g. 150 to 220° F. Asphalts having penetrations within the range of 20 to 30, and softening points within the range of 160 to 180° F., are particularly preferred.

The solvents used for reducing the consistency or viscosity of the asphalts, to thereby enable the formation of suitable water emulsions, include the well-known petroleum solvents, e.g. petroleum naphthas, kerosene, "Varsol," etc., having boiling ranges of about 200 to 550° F., e.g. 275 to 420° F. However, a variety of solvents may be readily utilized, the only requirements being that the solvent be volatile and capable of reducing the viscosity, i.e. increasing the penetration, of the asphalt. The amount of solvent utilized will naturally vary depending upon the original consistency of the particular asphalt utilized. Usually, the amount of solvent will be in the range of about 1 to 10 wt. percent, based on the weight of asphalt. Since the composition contains 50 to 65 wt. percent of asphalt, the amount of solvent, based on the total composition, will be in the range of 0.5 to 6.5 wt. percent. However, in any event, the amount of solvent used should be sufficient to reduce the viscosity of the asphalt to a value of about 6 to 40 poises at 230 to 260° F., and to increase the penetration (at 77° F.) to a value of about 100 to 200, in order that it may be emulsified in conventional equipment.

The asphalt-water emulsion suitable for use in the present invention will generally comprise about 50 to 65 wt. percent asphalt, based on the weight of asphalt prior to modification with solvent.

Additionally, the dispersion and stability properties of the emulsion are aided by use of various emulsifying agents in amounts of from 0.5 to 3.0 wt. percent. Suitable emulsifying agents include the alkali metal salts of $C_{10}$ to $C_{30}$ fatty acids and the high molecular weight fatty amines. A particularly useful emulsifying agent comprises a mixture of sodium soaps of high molecular weight resinous and oleaginous organic acids, commonly referred to by the trade name "Dresinate Soap," which is obtained as a product of the wood processing industry.

Additionally, it has been found that the addition of a small amount, e.g. 0.2 to 2.0 wt. percent, of the sodium salt of n-coco-amino butyric acid, sold under the trade name "Armeen SZ," will impart antifreeze properties to the emulsions and thereby increase their stability upon extended storage at low temperatures, e.g. as low as 10° F.

The preparation of the asphalt emulsions is accomplished by feeding separate streams of (1) the asphalt-solvent mixture at a temperature of about 225 to 260° F. and (2) the emulsifying solution at a temperature of about 120 to 150° F., to a conventional colloid mill or the like. The preferred emulsification temperature in the mill is about 170 to 190° F. The asphalt-solvent mixture is prepared (prior to emulsification) by blending metered quantities of the asphalt and solvent in the desired proportions by means of an orifice line blender, proportioner, or any other conventional mixing device, to form a uniform mixture. The mixture is stored at about the feed temperature until ready for use.

The emulsion compositions of the invention are readily applied to metallic surfaces by conventional spraying equipment.

The invention will be further understood by reference to the following examples which are given for illustrative purposes only and are not intended to be limiting.

EXAMPLE 1

Two asphalt emulsion compositions were prepared as follows. A modified asphalt of reduced viscosity was prepared by blending 10 wt. percent of a kerosene-type diluent having a 320 to 400° F. boiling range, with 90 wt. percent of an asphalt having a softening point of 160° F., and a penetration of 30, which was prepared by oxidizing by air blowing at 450 to 500° F. a flux having a softening point of 85 to 90° F. The modified asphalt had a softening point of 120° F. and a penetration of 163.

The above asphalt-solvent blend, maintained at a temperature of about 225 to 250° F. was fed to an Eppenbach colloid mill simultaneously with an emulsifying solution maintained at a temperature of about 140° F. The emulsifying solution used was a water solution containing 3.0% of "Dresinate Soap" with 0.3% of excess sodium hydroxide. The maximum temperature of the resulting emulsion was about 180° F.

The compositions of the emulsions are shown in the following table. Emulsions A and B were both prepared as indicated above except that 2.0 wt. percent of "Armeen SZ" (sodium salt of n-coco-amino butyric acid), based on the weight of Emulsion A, was added to Emulsion B to impart freeze-thaw stability.

TABLE I.—COMPOSITIONS OF ASPHALT EMULSIONS

|  | Composition, wt. percent | |
| --- | --- | --- |
|  | Emulsion A | Emulsion B |
| Asphalt, 160° F. S.P. | 54 | 54 |
| Solvent | 6 | 6 |
| Dresinate soap emulsifier | 1.20 | 1.20 |
| Sodium hydroxide | 0.12 | 0.12 |
| Water | 38.68 | 36.68 |
| Armeen SZ [1] |  | 2.00 |

[1] Sodium salt of n-coco-amino butyric acid.

The compositions were then subjected to the following standard tests. In each test steel panels were sprayed, prior to testing, with the asphalt emulsion using a De Vilbis sprayer, and subsequently dried. The dried film thickness was about 3 mils.

(1) Salt spray test.—This test is conducted by placing the coated test panels in a salt spray cabinet conforming to Method 4001.1 of Federal Specification VV–L–791E, and exposing them for a designated number of days. At the end of this period the panels are removed, cleaned with solvent, and examined for rust.

(2) Weather-O-Meter test.—This test is conducted by exposing the coated steel test panels to the test described in Method 615.1 of Specification TT–P–141 for a designated number of hours. At the conclusion of the test, the coating is examined for deterioration and defects.

Additionally, the emulsions were tested for freeze-thaw stability prior to actual use in order to determine their stability upon extended storage at low temperatures.

The results of the above tests are shown in the following table.

TABLE II.—ASPHALT EMULSION PERFORMANCE

| Test | Asphalt emulsion | |
| --- | --- | --- |
|  | A | B |
| Salt spray test: |  |  |
| Days in cabinet | 14 | 18 |
| Appearance after solvent cleaning | (1) | (1) |
| Weather-O-Meter: |  |  |
| Hours of test [2] | 750 |  |
| Coating appearance | (3) |  |
| Freeze-thaw stability: |  |  |
| Cycles [4] at 20° F | None | 25+ |
| Cycles at 10° F | None | 6 |

[1] Clear, no rust.
[2] One 21-hour cycle is roughly equivalent to 15 days exposure to natural weather conditions in a sunny location.
[3] No film deterioration.
[4] One cycle consists of 16 hours freezing at the low temperature indicated followed by 8 hours thawing at room temperature.

The above test results show that the asphalt emulsion compositions of the invention exhibited excellent rust preventive properties. Additionally, the incorporation of "Armeen SZ" imparted valuable freeze-thaw resistance to the emulsions prior to usage, thereby enabling them to be stored at low temperatures.

By way of comparison, a conventional solvent cut-back rust preventive composition containing approximately the same proportion of the same asphalt, when applied as a coating to the same steel test panels, showed serious cracking in the Weather-O-Meter test after 750 hours.

EXAMPLE 2

An automobile underside was washed thoroughly with water, left undried, and then sprayed with asphalt Emulsion A of Example 1, utilizing a De Vilbis sprayer. Excellent coverage was obtained with virtually no drippage, and solvent vapors were observed to be at a relatively low level. After six months of ordinary automobile usage during winter months the coating was examined and found to be in perfect condition, with no noticeable cracking or other defects.

What is claimed is:

1. A method for protecting the metal undersides of an automobile from corrosion which comprises coating said undersides by spraying them with an asphalt-in-water emulsion consisting essentially of, based on the total weight of said composition, from 50 to 65 weight percent of a relatively hard asphalt having a penetration at 770° F. of about 20 to 40 and a softening point in the range of about 150° to 220° F., from 0.5 to 6.5 weight percent of a volatile petroleum solvent boiling within the range of 200° to 550° F., said solvent being sufficient to increase the penetration of said asphalt to a value in the range of 100 to 200 measured at 77° F., and 28.5 to 49.5 weight percent of water, and wherein said emulsion includes about 0.2 to 2.0 weight percent, based on the total composition of the sodium salt of n-coco-amino butyric acid, whereby upon subsequent breaking of the emulsion and evaporation of said solvent an adherent, hard crack-resistant rust preventing asphalt coating remains on said vehicle undersides.

References Cited

UNITED STATES PATENTS

| 3,036,015 | 5/1962 | Woodward | 252—311.5 |
| 2,690,978 | 10/1954 | Cross | 106—277 |
| 2,780,557 | 2/1957 | Hardman et al. | 106—277 |
| 2,733,159 | 1/1956 | Scoggin et al. | 106—277 |
| 2,926,108 | 2/1960 | Anderson | 106—14 |
| 3,028,249 | 4/1962 | Hoiberg | 106—273 |
| 3,036,015 | 5/1962 | Woodward | 106—277 |
| 3,126,292 | 5/1964 | Bottero et al. | 160—277 |

OTHER REFERENCES

Abraham, Asphalts and Allied Substances, vol. III, 6th edition D. Van Nostrand Company, Inc., New York, TN 853, 1960 C. 3 (p. 394 relied upon).

DONALD J. ARNOLD, Primary Examiner.

U.S. Cl. X.R.

106—269; 277; 117—135, 168; 252—311.5, 390, 392